Figure 1:
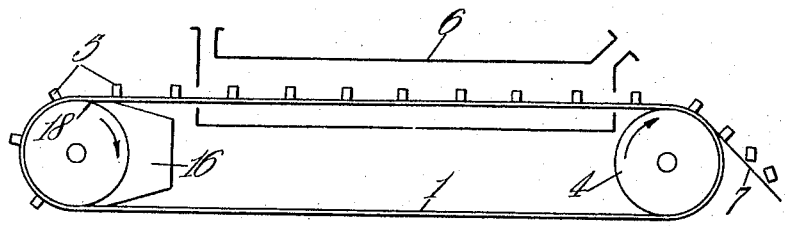

Sept. 22, 1959　　　　G. KAISER ET AL　　　　2,904,827
METHOD AND APPARATUS FOR THE MANUFACTURE OF SMALL
ARTICLES OR PELLETS FROM PASTE MATERIAL
Filed Jan. 17, 1955

Inventors
G. Kaiser
H. Kaiser
By Shoemaker Downing Kiebold
Attys.

United States Patent Office 2,904,827
Patented Sept. 22, 1959

2,904,827

METHOD AND APPARATUS FOR THE MANUFACTURE OF SMALL ARTICLES OR PELLETS FROM PASTE MATERIAL

Gunter Kaiser and Herbert Kaiser, Krefeld-Uerdingen, Germany, assignors to Sebastian Nicholas Rosin, London, England Application January 17, 1955, Serial No. 482,271

Claims priority, application Germany February 3, 1954

4 Claims. (Cl. 18—1)

This invention relates to a method and means for the production of small articles moulded from paste, more particularly small pellets of catalytic material as used in the chemical industry.

An object of the present invention is to provide an improved method and means for the production of such articles as set out above, hereinafter referred to as "pellets," so that the pellets are consistent as to shape and size and, where such are formed of porous structure material, the porosity is not impaired by over compression so that the pellets possess as great a surface area and permeability as possible.

A further object of the present invention is to provide an improved method and means for the production of pellets, according to the preceding paragraph, in which the pellets are shaped to have satisfactory aerodynamic characteristics such as is often required when using pellets as catalysts by allowing them to fall in a stream of gas in known manner.

A still further object of the present invention is to provide an improved method and means for the production of pellets, according to the two preceding paragraphs, in which production is effected continuously.

Heretofore such pellets have been manufactured according to one method by charging the paste material into a press which discharged through a multi-orifice plate so that the paste was extruded in vermiform strands which were cut into short lengths by a rotating knife means in front of the discharge plate, the resulting pellets then being dried as a further operation. One of the disadvantages of this method is that the extruded strands often adhere to the knife means and only drop off as aggregates and may cause extensive smearing of the press head; the result of this is that it is often necessary, after drying the pellets, to grade and classify the pellets in order to sort out damaged and imperfect products. A further disadvantage is that many substances used as catalytic materials do not stand up well to the relatively high pressure involved in the extrusion process, the material losing much of its porosity and often experiencing segregation of its liquid and solid phases inside the press so that pellets of non-uniform composition result.

According to another known method, the paste material is extruded as cylindrical lengths which are then formed into balls in the known manner of pill forming. Here again difficulties are encountered in the handling of the material and smearing up of the apparatus used; also the extrusion and pill forming treatments are again liable to cause respectively segregation and consolidation of the surface of the pills or pellets so that their surface is no longer porous.

According to a still further known method, the paste is forced into an orificed plate or band the surfaces of which are then scraped so that paste remains only in the charged orifice, where it is dried or allowed to dry. When dry the pellets are ejected from the orifices by the use of an ejector plate having projecting pins corresponding to the size and spacing of the orifices. With this method the porosity of the final pellets suffers since the orifice walls tend to mould a smooth surface on the pellets; furthermore this method entails laborious and extensive handling and the apparatus is very susceptible to damage since the ejector pins are easily bent rendering the ejector plate useless until repaired.

The present invention consists in a method of moulding pellets, from paste, particularly of catalytic material, comprising extruding the paste under low pressure through orifice means of short axial length, servering the extruded portion from the main mass, drying the pellets so formed while they are still held by the orifice means through which they were extruded and finally effecting separation of the dried pellets from the orifice means. By "orifice means of short axial length" is meant that the axial length is very short compared with the axial length of the extruded portion or pellet. Thus, for example, the orifice means are formed in a thin sheet of sufficiently rigid material such as metal or plastic and the orifice so defined may be circular or any other preferred shape. Preferably the orifice means are formed in an endless band movable to traverse an endless path.

By extruding the material through orifice means of short axial length, according to the present invention, the paste material is constricted for as short a time as possible and is not constrained laterally after extrusion so that expansion of the material forming the pellet may take place freely and so contribute to the establishment of the desired porosity.

The invention further consists in apparatus for moulding pellets from paste, particularly of catalytic material, comprising an orificed endless belt of a thickness which is very small compared with the axial length of the pellet to be extruded therethrough and a paste feeding device positioned and adapted to feed paste under the requisite pressure to the undersurface of the band such that the paste is caused to extrude through the band orifices.

According to one preferred form the feeding device comprises a rotary drum, forming one end turning point of the endless belt, which has a peripheral groove or channel in communication with an axial bore through which the paste material is fed under low pressure, a fixed closure member positioned adjacent the drum to act as a sliding seal or closure for the peripheral groove or channel over a substantial proportion of its circumferential extent, the endless belt comprising the closure means for the residual extent of the peripheral groove or channel, the arrangement being such that the paste is forced, via the axial bore feed in the drum, into the peripheral groove or channel whence it is extruded through the orifices in the endless band, the extruded portions forming the pellets being severed from the main mass in the peripheral groove or channel by the edge of the fixed closure member.

The invention further consists in apparatus according to the preceding paragraph, wherein the pellets extruded through the band orifices are carried by the band, upstanding therefrom, through a drying zone, and are finally removed from the band, preferably by flexing the latter as on its path around a second (plain) drum forming the other turning point for the endless band.

According to the invention, as set out in the three preceding paragraphs, the length of the pellets formed are dependant on the extrusion pressure for a given orifice diameter and the linear speed of movement of the band. Thus the pellet size (length) can be controlled by varying either or both of the factors, although it is preferred to effect control by pressure variation only since alteration of the band speed has a corresponding effect on the drying time.

The porosity of the pellets produced as set out above may be enhanced or ensured by, for example, incorporating a volatile vehicle or temporary component in the paste, (which in the case of catalytic material would be inert to the catalyst) such that, when the pellets enter the drying zone, evaporation of the volatile substance takes place with consequent production of voids in the residual pellets to increase their porsity. Alternatively or additionally the paste material may contain an included gas and the material extruded through the orifices into a drying zone of reduced pressure so that the included gas is withdrawn from the body of the pellet to create a porous structure.

Figure 5:
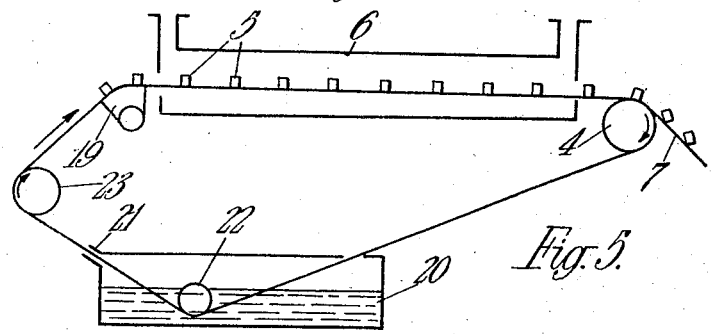
Figure 2:
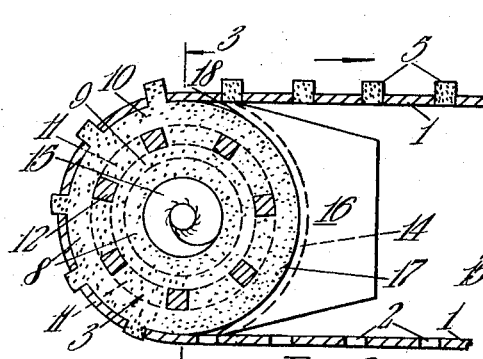
Figure 3:
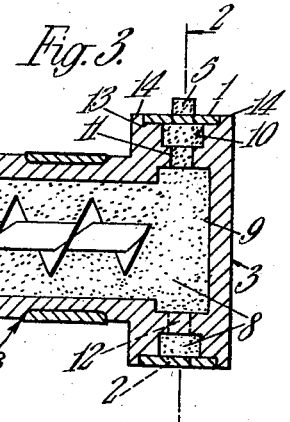
Figure 4:
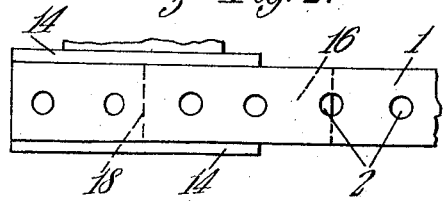
Figure 4A:
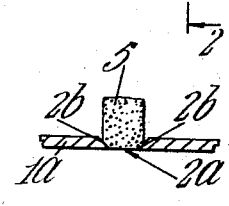

In the accompanying drawings:

Figure 1 is a side elevational diagram of the form of the apparatus according to the present invention, Figure 2 is a sectional side elevation of one end of the apparatus of Figure 1 showing greater detail, Figure 3 is a transverse section taken on the line 3—3 of Figure 2, Figure 4 is a plan view of the part shown in Fig. 2, Figure 4a is an enlarged sectional side elevation of a portion of the apparatus band showing one form of orifice therein, and Figure 5 is a side elevational diagram of an alternative form of apparatus, according to the present invention.

In carrying the invention into effect according to one mode, by way of example, an endless belt 1 having a spaced series of orifices 2 therein (see Figure 4) is supported between two turning point pulleys or drums 3 and 4, the drum 3 serving also as the feed device for the paste material as described hereafter. Paste material supplied via the drum 3 is extruded through the orifices 2 to produce upstanding pellets 5 which are carried away by the band 1 through a drying zone, such as the drying tunnel 6, and are finally discharged from the band 1, for example by flexing the band around the curvature of the turning point pulley or drum 4, removal of the pellets 5 from the band being assisted if necessary by a doctor or like device indicated at 7. The band 1 may be of any material of suitable rigidity, for example metal or "plastic" and has a thickness which is preferably very small relative to the axial length of the pellets 5; in the drawings the thickness of the band has been exaggerated for clearness. After the pellets 5 have been formed by extrustion through the orifices 2, the walls defining the latter are just sufficient to retain the pellet upstanding, so their major area is freely exposed to the air for drying and their final removal from the band is easy.

The drum 3 rotatably supported in bearings such as at B, Figure 3, also comprises the device by which the paste material 8 is delivered to the undersurface of the band 1 for extrusion purposes, comprises an internal chamber 9 and a peripheral groove or channel 10 which are in communication by radial passages 11 formed through the rim wall 12 of the drum. The drum periphery is also relieved by an annular cheek 13 to accommodate and guide the band 1 between flanges 14. Paste material 8 is fed under pressure to the chamber 9 by feeder means, such as the screw conveyor 15 or by a suitable pump, and is so forced into the channel 10 and out through the orifices 2 in the band to form the pellets 5. In order to blank off that part of the periphery of the drum 3 which is not in contact with the band 1, a closure member 16 is provided having an arcuate surface 17 disposed between the flanges 14 on the drum and extending from the point at which the band 1 contacts the drum periphery to the point at which the band leaves the drum periphery. The edge 18 of the closure member 16 serves as a scraper which co-operates with the edges of the orifices 2 to sever the extruded pellets 5 from the paste material 8 in the channel 10 and to scrape the underside of the band.

According to a modified form of the invention, illustrated in Figure 5, the feeding drum 3 previously used is replaced by a non-rotary feeding device 19, which otherwise operates in substantially the same way. Figure 5 also shows the return lap of the band passing through a bath 20 of cleaning liquid, should this be necessary, the band being wiped by wiping means 21 on leaving the bath. This band cleaning device can be applied equally to the form of the invention shown in Figures 1 to 4, the band being diverted by additional pulleys or drums 22 and 23.

While the band 1 shown in the drawing has only one row of orifices 2, it is to be understood that a plurality of rows can be used, and the orifices may be of other than circular shape as preferred.

As an alternative to forming the orifices in sheet material or band of a thickness giving the desired "orifice means of short axial length," the sheet material or band may be of greater thickness and the short axial length of the orifice means obtained by tapering the walls defining the orifice means outwardly from the base of the orifice means to reduce their effective axial length, see Figure 4a, where the orifice 2a in the band 1a has upwardly tapering side walls 2b.

It is therefore clear that the invention contemplates a chamber for receiving paste, and associated therewith a pellet shaping member having a plurality of apertures or orifices therethrough that define the cross-sectional shape of individual pellets. This shaping member is supported in juxtaposition to the chamber, that is the outlet thereof, and means are provided for forcing paste out of the chamber and through the orifices under sufficient pressure to cause the paste to project beyond the orifices a substantial distance to define separate pellet-forming portions of paste having the major surface area thereof in exposed condition. Pellet severing or scraper means are associated with only that surface of the pellet shaping member that is adjacent the chamber so that in response to relative movement between the shaping member and the chamber, the pellet-forming portions are severed from the mass of paste in the chamber and shaped individual pellets are retained and supported in the pellet shaping member by only their extreme inner end portions. After the pellets have been severed, the shaping member is moved through a drying chamber with the major surface area of each pellet still in exposed condition so that such area is subjected to drying conditions whereby the pellets are rapidly dried.

What is claimed is:

1. Apparatus for molding pellets from paste, particularly of catalytic material comprising an endless band having a series of spaced orifices therein which are of very small axial length compared with the axial length of the pellet to be extruded therethrough, a paste feeding device positioned and adapted to feed paste under the requisite pressure to a surface of the band such that the paste is caused to extrude through the band orifices, band scraper means disposed only on the side of the band on which the paste feeding device is positioned, the arrangement being such that the paste projects from the band, on the side thereof remote from the paste feeding device, as pellets held in the orifices only by their end portions, said paste feeding device comprising a rotary drum forming one end turning point of the endless band, said drum having an axial bore therein and also having a peripheral groove in communication with said axial bore, means for forcing paste under pressure through said bore and into said groove, and a fixed closure member positioned adjacent the drum to blank off the peripheral groove over a substantial portion of its circumferential extent, said endless band comprising closure means for the residual extent of the peripheral groove, the arrangement being such that the paste is forced, via the axial bore in the drum, into the peripheral groove from whence it is extruded through the orifices in the endless band to extend outwardly thereof in the form of extruded projecting pellet-forming portions, one edge of said fixed closure member comprising said band scraper means, and said projecting pellet-forming portions being severed from the main mass in the peripheral groove by said one edge of the fixed closure member in response to movement of the band means past said one edge to form individual pellets which are retained in the orifices by their extreme inner end portions.

2. Method of preparing pellets from paste material, particularly catalytic material comprising extruding paste through a plurality of orifices that define the cross-sectional shape of individual pellets under sufficient pressure so as to force paste through the orifices to project therebeyond a distance substantially in excess of the axial dimensions of the orifices so as to provide separate pellet-forming portions of paste having the major surface area thereof in exposed condition, severing the pellet-forming portions from the paste at the ends of the orifices remote from the exposed ends of the pellet-forming portions, so that the individual pellets are retained and supported in the orifices by only their extreme inner end portions, after such severing moving the supported pellets through a drying chamber with the major surface area thereof exposed so as to subject such exposed surface area to direct drying conditions so as to rapidly dry the pellets and thereafter removing the dried pellets from the orifices.

3. Apparatus for molding individual pellets from paste material, particularly catalytic material, comprising a pellet-forming member having a plurality of apertures therethrough for defining the cross-sectional shape of pellets, means on one side of said member defining an extrusion chamber having an outlet, supporting means on said one side of said member for supporting said member so that the surface of said one side of the member is in juxtaposition to the outlet of said chamber so that the aperture also define die orifices, means cooperably associated with the chamber for forcing paste through the outlet of said chamber and through said apertures in said member at a pressure sufficient to extrude individual pellet-forming portions that project beyond the surface of the other side of said member a distance substantially in excess of the thickness of the member so that the major surface area of each pellet-forming portion is in exposed condition, and means also on said one side of said member for severing the pellet-forming portions from the paste in the chamber at the surface of said one side of said member so that individual pellets are retained in the aperture by only their extreme inner end portions.

4. Apparatus for moulding individual pellets from paste material, particularly catalytic material comprising an endless band means having a series of spaced orifices therethrough, means on one side of said band means defining a chamber for receiving paste, said chamber having an outlet, supporting means on said one side of said band means supporting said band means so that the surface of said one side of the band means passes in juxtaposition to said outlet, means cooperatively associated with said chamber for forcing paste from the outlet of the chamber through said orifices as the latter pass in juxtaposition to the outlet at a pressure sufficient to extrude individual pellet-forming portions that project beyond the surface of the other side of said band means a distance substantially in excess of the thickness of the band means so that the major surface area of each pellet-forming portion is exposed, and pellet severing means cooperatively associated with only the surface of said one side of said band means for severing said pellet-forming portions from the paste in the chamber so that the individual pellets formed in the orifices and projecting therebeyond are held in the orifices only by their extreme inner portions.

References Cited in the file of this patent

UNITED STATES PATENTS

| | | |
|---|---|---|
| 1,106,087 | du Pont et al. | Aug. 4, 1914 |
| 1,751,430 | Thomson | Mar. 18, 1930 |
| 1,765,804 | Preston | June 24, 1930 |
| 2,170,445 | Colbert | Aug. 22, 1939 |
| 2,186,415 | Haworth | Jan. 9, 1940 |
| 2,325,374 | Cover | July 27, 1943 |
| 2,401,236 | Fielitz | May 28, 1946 |
| 2,413,735 | Shabaker | Jan. 7, 1947 |
| 2,617,167 | Johnson | Nov. 11, 1952 |
| 2,649,618 | Rhodes et al. | Aug. 25, 1953 |
| 2,653,350 | Piperoux | Sept. 29, 1953 |
| 2,669,195 | Pellegrino | Feb. 16, 1954 |